May 17, 1938.  W. K. QUEEN  2,117,853

VALVE STRUCTURE

Filed Nov. 16, 1936

INVENTOR:
Walter K. Queen
By Geo. K. Woodworth.
ATTORNEY:

Patented May 17, 1938

2,117,853

UNITED STATES PATENT OFFICE 2,117,853

VALVE STRUCTURE

Walter K. Queen, Needham Heights, Mass.

Application November 16, 1936, Serial No. 110,972

3 Claims. (Cl. 277—33)

The object of the present invention is to provide a unitary structure comprising a rotary valve and a seatless valve with common actuating means therefor. This structure possesses many advantages, some of which follow:

When the valve member, either disc shaped or conical or of any other shape or type, is raised slightly from its seat erosion or wire drawing results inevitably, and as the valve member is maintained but slightly off its seat for a substantial time in order gradually to increase the pressure in the line or apparatus connected to the valve outlet before it is fully opened, such erosion or wire drawing in course of time becomes excessive. By means of the present invention this undesirable effect is wholly eliminated for the reason that there can be no flow of fluid under pressure at high speed between the rotary valve member and its seat. When the valve stem has been raised sufficiently to permit the seatless or piston valve to uncover ports in the cylinder in which said piston valve operates and thereby permit a flow of fluid under pressure to the valve outlet, the rotary valve is not in close proximity to its seat.

The rotary valve may be employed to close the connection between the valve inlet and outlet after the packing of the piston valve becomes ineffective for this purpose and thereby the effective life of the valve structure is prolonged.

In commercial power plants, on steamships, and in water distribution systems, reserve apparatus, such as turbines, pumps and generators, for example, are always maintained and frequently such apparatus remain idle for long periods of time, during which periods of idleness they are "secured", that is to say, the source of fluid pressure is completely disconnected therefrom by all means available for this purpose. By means of the present invention the rotary valve member makes steam-tight connection with the valve seat member, thereby shutting off the fluid pressure from the piston valve, and in this way prolongs the life of the packings thereof.

Various other advantages inherent in the present invention will readily occur to those skilled in the art.

In the drawing which accompanies and forms a part of this application,—

Figure 1:
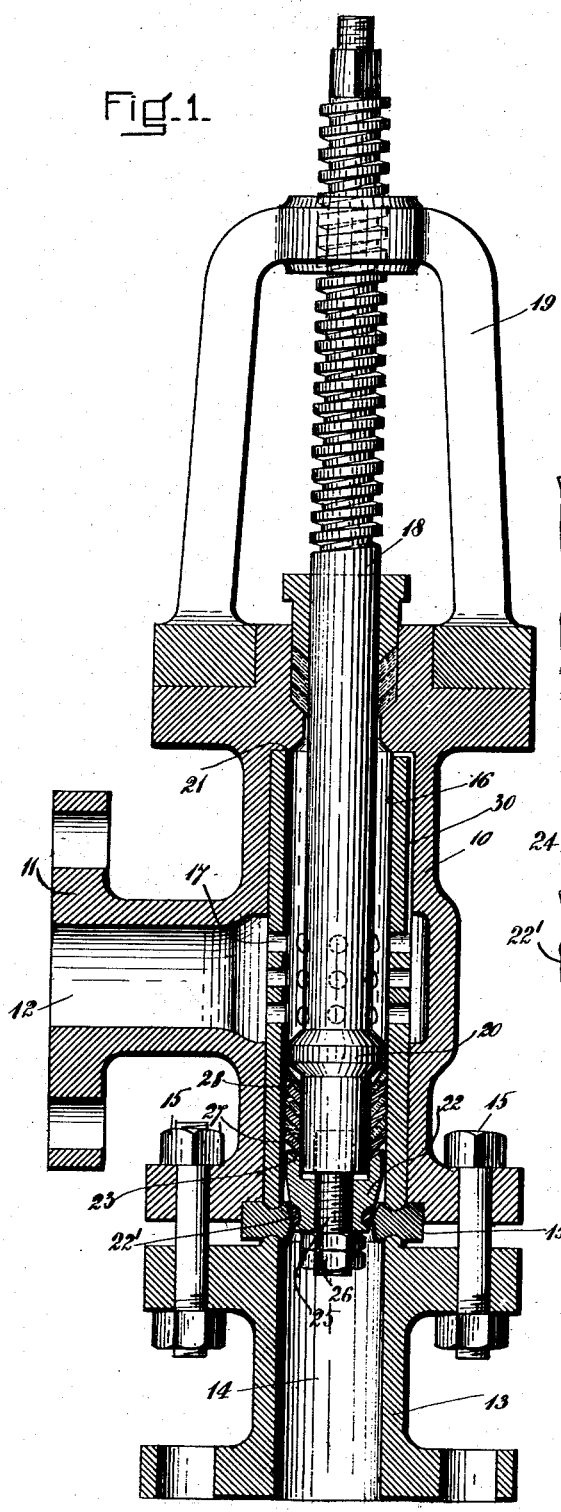
Figure 1 is a longitudinal central section of a valve structure embodying my invention.

In the particular drawing selected for more fully disclosing the principle underlying my invention 10 is a valve casing having a coupling flange 11 provided with the outlet 12 cast integral therewith and, in the present instance, the coupling flange 13 having the valve inlet 14 secured thereto by the bolts 15, the annular valve seat member 15' being clamped between the lower end of said casing and said inlet coupling flange.

Disposed within the central bore of said casing is a cylinder or sleeve 16 provided with the ports 17 intermediate the ends thereof. The piston rod or stem 18, the diameter of which is smaller than the internal diameter of said cylinder, is arranged in the latter and the upper end thereof has threaded engagement with the yoke 19 secured in any suitable manner to the upper end of the casing. By means of a wheel (not shown) or other suitable means, the valve stem is given rotary and longitudinal movements within the cylinder 16.

Near its lower end the valve stem is provided with the annular abutment 20 preferably formed integral therewith and having, in the present instance, two opposed conical surfaces the upper of which co-operates with the conical depression 21 formed in the casing when the valve stem is at the upper limit of its movement. As shown in Fig. 1, the annular abutment 20 lies below all of the ports 17 when the valve member 22 is in engagement with the valve seat member 15' and if the ported cylinder 16 is omitted, below the outlet 12.

Adjustably secured to the lower end of the valve rod is the valve member 22, the lower portion of which is conical and is disposed for engagement with the valve seat member. Preferably the valve seat is provided with a central conical bore with which the valve member is adapted to make a fluid-tight fit.

In the present instance, the bore in the valve seat member is provided with a double taper so that a line contact, substantially, and not a surface contact is obtained between the valve and valve seat members.

Preferably the valve member is provided at its point of contact with the valve seat member with a hard metal inset 22', formed preferably by burning into a peripheral groove formed in said valve member a suitable substance such as "Stellite".

The upper portion of the valve member is apertured to receive the lower end of the valve stem and terminates in the movable annular abutment 23, the inner end of which is provided with a concave conical surface 24. The valve member is adjustably secured to the stem 18 by the stud 25 threaded to the lower end of said stem and by the nuts 26 which are in threaded engagement with the lower end of said stud. A valve having a valve member so secured to the valve stem and therefore adjustable to slight irregularities in axial alignment is termed a "rotary valve" and it is in this sense that such term is employed herein.

Within the space between the fixed and movable abutments packing of any suitable type is placed, and in the present instance, I have shown conical rings forming a self-setting packing of the type described in my Patent No. 1,716,977, issued June 11, 1929. While it is to be understood that my invention is not limited to any particular type of packing, for completeness of disclosure I have represented in the drawing an arrangement that has given good results in practice, viz., alternately disposed rings 27 of any suitable packing metal and rings 28 of material more flexible than metal as, for example, woven asbestos provided with wire insertion, each of said rings having the form of a truncated cone at its outer end and a conical depression at its inner end. Preferably the asbestos rings are treated with a phenol-formaldehyde condensation product to harden the same and prevent the abrasion thereof as the piston valve is moved past the ports formed in the sleeve 16.

As shown in Fig. 1, the angle between the conical surfaces of the rings and the inner wall of the sleeve is smaller than the angle between said inner wall and the conical surfaces of the abutments 20 and 22. By means of the nuts 26 the valve member may be moved upwardly to exert the proper compression upon the packing rings, said valve member not being in threaded engagement with the stud 25, and secure thereby a fluid-tight fit between the outer peripheries of said rings and the sleeve and the inner peripheries thereof and the valve stem.

Figure 2:
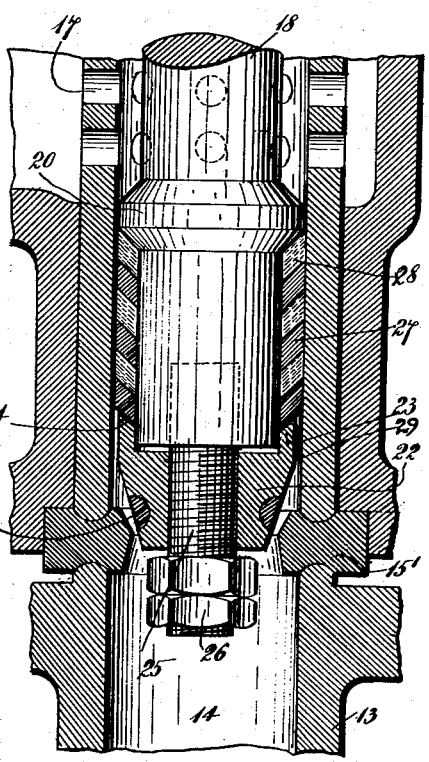
Fig. 2 is a fragmentary longitudinal central section on an enlarged scale.

When the valve member is raised off its seat, fluid pressure is exerted on the lowermost packing ring by way of the annular clearance 29 between the movable abutment and the sleeve 16. Such pressure so exerted on said rings forces the working edges thereof into firm and fluid-tight contact with the interior surface of the sleeve and the exterior surface of the valve stem. Such pressure also is exerted on the valve member and forces the surface 24 of the upper portion thereof, which as aforesaid constitutes a movable abutment, against the lowermost packing ring, as shown in Fig. 2.

The operation is as follows:

After the proper pressure has been applied to the packing rings by the nuts 26, the piston valve affords a fluid-tight joint interposed between the valve inlet and outlet, and, as will be obvious, it is unnecessary so long as the piston valve is in fluid-tight fit with the sleeve to have the valve member in engagement with the seat member for effecting this result.

When the piston valve is moved upwardly a sufficient distance to uncover the lower portion of the lowermost port 17, there will be a flow of fluid under pressure through the conical space between the interior of the sleeve 16 and the surface of the valve member and through the annular space 29 which is of sufficient width to prevent erosive action.

It is to be understood that even a substantial amount of erosion of the non-contacting portion of the valve member is not harmful, and that one of the salient features of this invention is that thereby erosion of the valve seat member and the contacting portion 22' of the valve member is entirely eliminated.

Pressure having been gradually established in the line connected to the valve outlet, the valve is moved farther upwardly until all the ports 17, or as many of them as desired, are uncovered, in which case the abutment 20 will be located at or near the upper end of the space between the valve stem and the sleeve.

Inasmuch as the space between the sleeve and valve stem above the abutment 20 is, generally speaking, filled or partly filled with liquid when the piston valve is in its lower position, it is necessary to provide means to prevent compression of such liquid in the upper portion of said space by the upward movement of said abutment 20. For this purpose there is provided a duct 30 connecting the upper portion of said space with the valve outlet passage.

After the working surfaces of the packing rings have become worn and the fit between the piston valve and sleeve or cylinder 16 is no longer fluid-tight, the efficiency of said valve may be restored by tightening the nuts 26 and thereby subjecting the rings to additional pressure or by closing the valve member on its seat by means of the actuating wheel aforesaid, and then by further operation of said wheel, compressing said packing rings between the fixed and movable abutments.

Having thus described an illustrative embodiment of my invention without, however, limiting the same thereto, what I claim and desire to secure by Letters Patent is:

1. A multiple valve structure comprising in combination, a casing provided with inlet and outlet passages, a cylinder enclosed within said casing, said cylinder being provided with a port open to said outlet passage, an annular valve seat member associated with the lower end of said cylinder adjacent to said inlet passage, a valve stem enclosed within said cylinder, a valve member adjustably secured to said stem and having limited axial movement with respect thereto, said valve member being disposed for engagement with said valve seat member and the upper portion thereof terminating in an annular abutment, the peripheral surface of which is spaced away from the inner surface of said cylinder sufficiently to prevent erosion, said stem being provided near its lower end and above said valve member with an annular abutment fixed with respect thereto and lying below said port when said valve member is in engagement with said valve seat member, and packing members disposed on said valve stem between said abutments, the outer peripheral surfaces of said packing members being in contact with the inner surface of said cylinder.

2. A multiple valve structure comprising in combination, a casing provided with inlet and outlet passages, an annular valve seat member associated with the lower end of said casing adjacent to said inlet passage, a valve stem enclosed within said casing, a valve member secured to said stem and disposed for engagement with said valve seat member the upper portion of said valve member terminating in an annular abutment, the peripheral surface of which is spaced away from the inner surface of said casing sufficiently to prevent erosion, said stem having an annular abutment near its lower end and above said valve member said annular abutment lying below said outlet passage when said valve member is in engagement with said valve seat member, and packing members disposed on a portion of said valve stem between said abutments.

3. A multiple valve structure comprising in combination, a casing provided with inlet and outlet passages, an annular valve seat member associated with the lower end of said casing adjacent to said inlet passage, a valve stem enclosed within said casing, a valve member adjustably secured to said stem and having limited axial movement with respect thereto, said valve member being disposed for engagement with said valve seat member and the upper portion thereof terminating in an annular abutment the peripheral surface of which is spaced away from the inner surface of said casing sufficiently to prevent erosion, said stem being provided near its lower end and above said valve member with an annular abutment fixed with respect thereto and lying below said outlet passage when said valve member is in engagement with said valve seat member, and packing members disposed on said valve stem between said abutments.

WALTER K. QUEEN.